Feb. 24, 1942.　　　L. L. HOUCHIN　　　2,274,142
MULTIFOCAL OPHTHALMIC LENS
Filed Jan. 15, 1940　　　2 Sheets-Sheet 1

INVENTOR
Lowell L. Houchin.
BY Corbett + Mahoney
ATTORNEYS

Feb. 24, 1942.  L. L. HOUCHIN  2,274,142

MULTIFOCAL OPHTHALMIC LENS

Filed Jan. 15, 1940  2 Sheets-Sheet 2

INVENTOR
Lowell L. Houchin.
BY *Corbett + Mahoney*
ATTORNEYS

Patented Feb. 24, 1942

2,274,142

UNITED STATES PATENT OFFICE 2,274,142

MULTIFOCAL OPHTHALMIC LENS

Lowell L. Houchin, Columbus, Ohio, assignor to The Revalens Co., Columbus, Ohio, a corporation of Ohio Application January 15, 1940, Serial No. 313,871

3 Claims. (Cl. 88—54)

My invention relates to multifocal ophthalmic lenses. It has to do, more particularly, with a lens made from a single piece of glass and having a plurality of fields of vision produced by forming areas of different curvature on the surface thereof.

Lenses of this general type are commonly referred to as one-piece lenses. The most common type of multifocal one-piece lens in use at the present time is the one-piece bifocal lens. This lens embodies a single piece of glass which usually has one surface thereof ground in such a manner that areas of different curvature are formed thereon. The lens usually has an outer area which is ground to the proper curvature to serve as the distance portion and an inner area which is ground to a different curvature to serve as the near portion. The near portion or near field has been made in various shapes and is usually located in the lower portion of the lens.

I have found that this type of one-piece lens does not meet all the requirements of a person who ordinarily desires to use the distance portion but frequently desires to use the near portion. For example, storekeepers, doctors, dentists, or persons doing certain types of desk work, who must wear glasses, would prefer to have a distance portion so located in the lens that it would be used in viewing persons on the opposite sides of a desk or counter merely by looking straight ahead. Such a distance portion should be disposed horizontally substantially at the center of the lens and have considerable width but need not have much height. However, since such a person frequently does close work, he would like to have a near vision portion so located that it could be readily used when looking down or up at close objects. For example, when a storekeeper is looking for an article disposed on the shelves of his store, he would desire to have the near vision portion so located that if he looked upwardly to a high shelf or downwardly to a low shelf, the near portion could be readily used.

One of the objects of my invention is to provide a one-piece multifocal ophthalmic lens which meets all the requirements discussed in the preceding paragraph.

Another object of my invention is to provide a one-piece lens of the type indicated which is very neat and attractive in appearance.

Another object of my invention is to provide a lens which meets all the requirements previously discussed but which is of such a nature that it may be produced at a comparatively low cost.

In its preferred form, my invention contemplates the provision of a one-piece multifocal ophthalmic lens which is made from a single piece of glass which has substantially the same refractive index throughout its mass. This piece of glass is preferably of concavo-convex form having its convex surface formed with a predetermined curvature throughout its entire area and having separate areas of different curvature formed on the concave surface thereof. These areas of different curvature form the different vision portions of the lens. These different vision portions preferably include an elongated horizontally disposed distance vision portion located substantially at the center of the lens, a near vision portion disposed directly above and a near vision portion disposed directly below the elongated distance vision portion, and a surrounding distance vision or intermediate vision portion.

The preferred embodiment of my invention is illustrated in the accompanying drawings wherein similar characters of reference designate corresponding parts and wherein.

Figure 1:
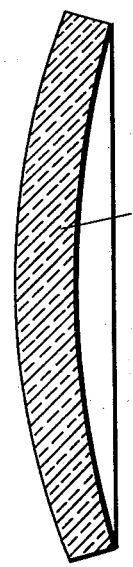
Figure 1 is a vertical sectional view taken through a rough lens blank which may be used in producing my lens.

With reference to the drawings, I illustrate in Figure 1, a rough blank 1 which is preferably formed of glass which has substantially the same index of refraction throughout its entire mass. This rough blank 1 is of concavo-convex form.

Figure 2:
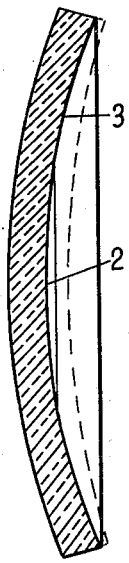
Figure 2 is a similar view showing the lens blank after one surface has been ground to form thereon a centrally disposed circular near vision portion and a surrounding distance vision portion.
Figure 6:
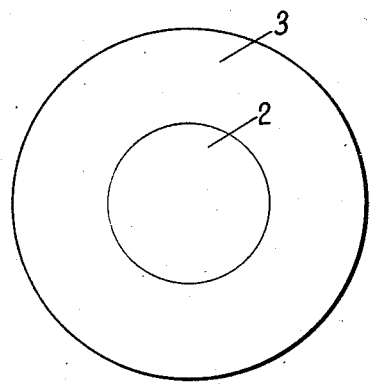
Figure 6 is a plan view of the blank shown in section in Figure 2.

In producing my lens, the first step is to form on the concave surface of the blank 1 an inner centrally disposed circular near vision portion 2 and an outer surrounding distance vision portion (Figures 2 and 6). This is accomplished in the usual way by grinding simultaneously two different curves on the surface of the lens blank which produce the vision portions 2 and 3. The curvature of the near vision portion 2 will have a longer radius than the curvature of the distance vision portion 3, as is well known. Thus, the near vision portion 2 will be a raised or button-like portion which will have its surface disposed above the surface of the distance vision portion 3. The curvatures of the surfaces of the portions 2 and 3 are produced roughly, as the blank is later subjected to a polishing operation.

The next step in producing my lens is to produce the inner distance vision portion which is adapted to be formed substantially at the center of the lens blank. This inner distance vision portion may have various forms. It is preferably elongated and is horizontally disposed in the finished lens so that it will be of considerable width but not of a very great height. It is produced by grinding away a portion of the inner vision portion 2 to form an elongated cavity therein.

Figure 7:
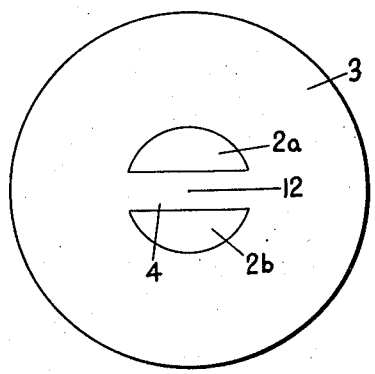
Figure 7 is a plan view of the concave side of a lens blank made according to my invention.

For example, I may produce a lens blank of the type disclosed in Figure 7. This lens blank embodies the outer distance vision area 3 of a suitable curvature, the inner centrally disposed distance vision portion 4 and the near vision portions 2a and 2b, formed directly above and below the inner distance vision portion 4.

Figure 3:
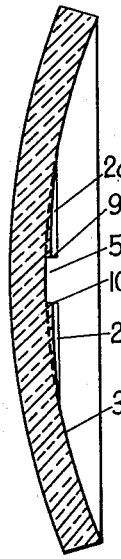
Figure 3 is a similar view illustrating the lens blank after a cavity has been ground in the circular near vision portion to produce a centrally disposed distance vision portion.

To produce this lens blank illustrated in Figure 7, it is merely necessary to grind an elongated cavity 5 in the centrally disposed circular near vision portion 2, as illustrated in Figure 3. This cavity or slot 5 may be produced in the manner illustrated diagrammatically in Figure 13. To accomplish this, the lens blank illustrated in Figures 2 and 6 is placed on a carrier 6 which is adapted to be swung about an axis 7. The radius of this swinging movement is adjusted so as to produce a curvature on the bottom of the cavity 5 which is the same as the surrounding distance vision portion 3. The lens blank 1 is disposed with its concave side uppermost, as indicated. This side has the areas 2 and 3 formed thereon, as previously stated. A rotating tool 8 is disposed in contact with the surface of the area 2 of the lens blank. It will thus be apparent that when the lens blank 1 is swung back and forth in a straight line relative to the tool 8, a transversely extending slot or cavity 5, of a width corresponding to the width of the tool, will be formed in the portion 2 of the lens blank. During the swinging movement of the lens blank, the blank is prevented from rotating about its own axis but the tool rotates at a high speed about its own axis. This will produce a spherical surface on the bottom of the cavity 5. The details of a machine which I may use in producing this lens are disclosed in my copending application, Serial No. 316,691, filed January 31, 1940.

Figure 8:
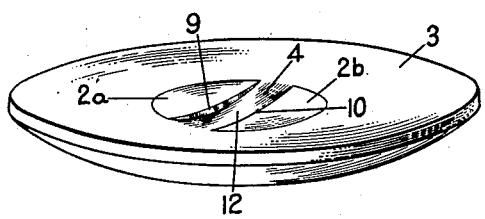
Figure 8 is a perspective view of the lens blank shown in Figure 7.

Thus, as previously indicated the lens blank illustrated in Figure 7, produced in the manner just described, will have an outer surrounding distance vision portion 3 and an inner vision portion 4. The surface of the portion 4 will be of the same curvature as the surface of the distance vision portion 3 and the ends of the portion 4 will completely merge with the portion 3. In producing the distance vision portion 4, the inner circular vision portion 2 is divided and near vision portions 2a and 2b are produced directly above and below the distance vision portion 4. As illustrated in Figure 8, in producing the cavity which forms the distance vision portion 4, shoulders 9 and 10 are formed at the dividing lines between the portion 4 and the portions 2a and 2b. These shoulders are thickest in the middle and gradually decrease in thickness towards the ends of the portion 4. The circular edges of the near vision portions 2a and 2b will substantially merge with the distance vision portion 3.

Figure 5:
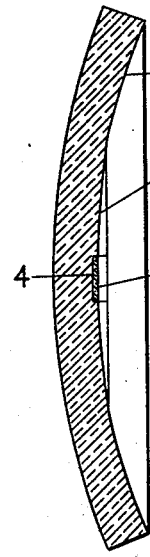
Figure 5 is a similar view showing how a protecting segment of glass may be disposed in the cavity, forming the inner distance portion, during the polishing of the other vision portions.

At the time the cavity 5 is formed in the lens blank, its surface is polished to its final accurate curvature. In this instance, this curvature will be the same as the final curvature of the outer distance vision portion 3. However, as previously stated, the surfaces of the portions 2 and 3 were merely initially roughly ground to the proper curvatures. Consequently, after the area 4 is produced, it is necessary to subject the surfaces of the portions 2 and 3 to the final polishing operation. In order to protect the bottom surface of the cavity 5 and the shoulders 9 and 10, during this polishing operation, the cavity 5 is filled with a protecting segment or wafer of glass 11, as illustrated in Figure 5. As the tool polishes the surfaces of the portions 2a, 2b and 3, the segment or wafer 11 will protect the finished bottom surface of the cavity and the shoulders 9 and 10 and will prevent the tool from grinding into the surfaces of portions 2a and 2b to an undesirable extent at spots. When the polishing operation is completed, the segment or wafer 11 may be removed.

In cutting the lens from the blank illustrated in Figures 7 and 8, it is preferred that it be cut in such a manner that a substantial portion of area 3 remains which will completely surround the inner areas. The opposite or convex surface of this lens blank may be finished to the proper corrective curvature for a particular patient prior to the cutting of the lens from the blank. If desired, the protecting segment or wafer 11 may be left in position during the cutting of the lens from the blank and during all the final surfacing operations. Thus, the inner distance portion 4 and the adjacent shoulders 9 and 10 will be protected until the lens is finally completed.

This lens will have many advantages. With the area 4 formed by producing a cavity extending completely across the circular near vision portion 2 and with the bottom surface of the cavity of the same curvature as that of the outer distance vision portion 3, the line of vision may pass from one of the areas 3 and 4 to the other without any change in focal power. The optical center of the inner vision portions 2a and 2b will be located within the distance vision portion 4 and substantially at the center of the lens blank, as indicated at 12 in Figure 7. In cutting the lens from the lens blank, it is preferably accomplished in such a manner that the shoulders 9 and 10 are disposed substantially horizontally. The optical center 12 is located adjacent both of these shoulders. Consequently, there will be no "jump of the image" or prismatic displacement when the eye passes from the vision portion 4 into either of the near vision portions 2a and 2b or vice versa. It will be apparent that the distance vision portion 4 will be centrally located so that the wearer of the lens when looking directly ahead will look through the area 4. The line of vision may pass from one side to the other of the lens without passing through the near vision portions. However, if the wearer of the lens desires to use a near vision portion, the line of vision may quickly pass upwardly into the near vision portion 2a or downwardly into the near vision portion 2b. The distance vision portion 4 will normally be used rather than the outer distance vision portion 3 which may be used when driving a car or under similar circumstances when looking at distant objects with the line of vision passing from one side of the lens to the other, upwardly above the portion 2a, or downwardly below the portion 2b.

The lens just described will be a bifocal lens, since it merely has areas of two different focal powers, although it has four visual areas, viz., the areas 2a, 2b, 3 and 4.

Figure 4:
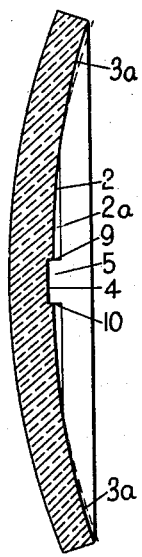
Figure 4 is a similar view illustrating how the surrounding outer area of the lens blank may be ground to a curvature suitable for intermediate vision rather than distance vision.
Figure 9:
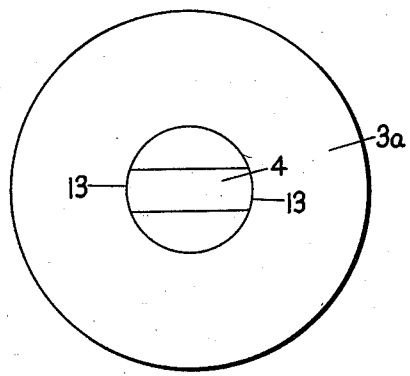
Figure 9 is a view similar to Figure 7 but showing a lens blank wherein the outer area serves as intermediate vision portion.

However, it is possible to readily produce a trifocal lens embodying the advantages of my invention rather than this bifocal lens. A lens blank for producing a trifocal lens is illustrated in Figure 9. This lens blank is substantially the same as that indicated in Figures 7 and 8 with the exception that the outer area 3a is adapted to serve as an intermediate vision portion instead of as a distance vision portion. To produce this lens blank it is merely necessary to grind the area 3a, surrounding the central near vision portion 2, to a proper curvature suitable for intermediate vision, as indicated in Figure 4. The curvature of the area 3a will be different from the curvature of the area 4 which will be produced exactly as before. More specifically, the area 3a will have a longer radius of curvature than the radius of curvature of the surface of the distance vision portion 4. Since the radius of curvature of the surface of the portion 4 is shorter than that of the portion 3a, the ends of the cavity, forming the area 4, will substantially merge with the surface 3a along the hair lines 13 which form continuations of the circular boundary lines of the near vision portions 2a and 2b.

It is important that the curvature of the surface of the distance vision portion 4 be of lesser radius than that of the intermediate vision portion 3a so that the ends of the portion 4 will substantially merge with the portion 3a or that it be of the same radius as the surrounding area 3 or 3a so that the ends will completely merge with the surrounding area, as indicated in Figure 7. In no case should the radius of curvature of the surface of the distance vision portion 4 be greater than that of the surface in which the elongated cavity is formed inasmuch as this would result in shoulders being formed at the ends of the cavity which is undesirable. Thus, in all cases the radius of curvature of the surface of the cavity should be the same (Figure 7) or less (Figure 9) than the radius of curvature of the surface which will be disposed adjacent the ends of the cavity.

Figure 10:
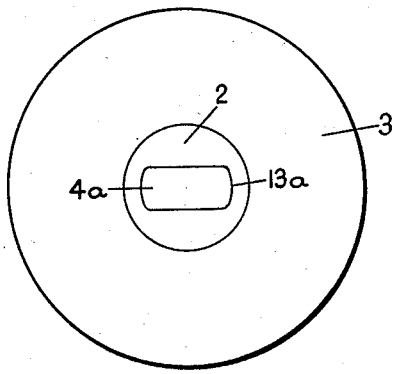
Figure 10 is a view similar to Figure 7 but showing a lens blank of slightly different form wherein the near vision portion entirely surrounds the inner distance vision portion.

In Figure 10, I illustrate a lens blank similar to that shown in Figure 7 with the exception that the near vision portion 2 completely surrounds the inner distance vision portion 4a. The outer distance vision portion 3, on the other hand, will completely surround the circular near vision portion 2. This lens blank will be produced in substantially the same manner as before with the exception that the cavity forming the portion 4a will not extend completely across the near vision portion 2 but will terminate along the curved lines 13a spaced from the outer circular edge of the portion 2. In this instance, the radius of curvature of the surface of the inner distance vision portion will be shorter than the radius of curvature of the near vision portion. Consequently, there will be no shoulders formed at the ends of the portion 4a but such ends will substantially merge with the portion 2 along the hair lines 13a. Although I have stated that the area 3 is of such a curvature that it serves as a distance vision portion, it is to be understood that it may be of such curvature that it will serve as an intermediate vision portion.

Figure 11:
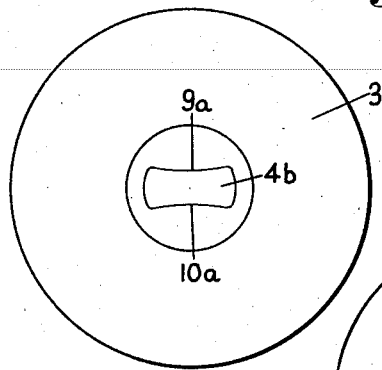
Figure 11 is a similar view showing a lens blank similar to that shown in Figure 10 but having an inner distance vision portion of a different shape.
Figure 13:
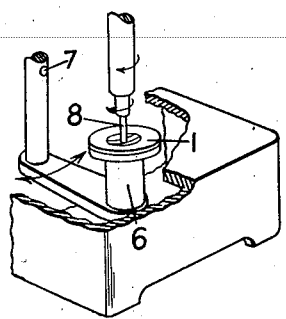
Figure 13 is a more or less diagrammatic view illustrating a portion of the apparatus which may be used in producing my lens.

In Figure 11, I have illustrated a lens blank which is very similar to that shown in Figure 10. However, the inner distance vision portion 4b is of different outline. It is provided with a downwardly curved shouldered upper boundary line 9a and an upwardly curved shouldered lower boundary line 10a. It will be apparent that the cavity, forming the inner distance vision 4b, will have a width corresponding to the diameter of the tool 8 midway between its ends but gradually increases in width towards the ends of the cavity. This cavity may be produced in the same manner as illustrated in Figure 13 with the exception that the lens blank will be caused to follow an arcuate path when it swings about the pivot 7 in one direction and a reverse arcuate path when it swings back in the opposite direction. The manner in which the swinging movement of the lens blank relative to the tool is controlled to produce a cavity of the outline shown in Figure 11 is described in detail in my copending application.

Figure 12:
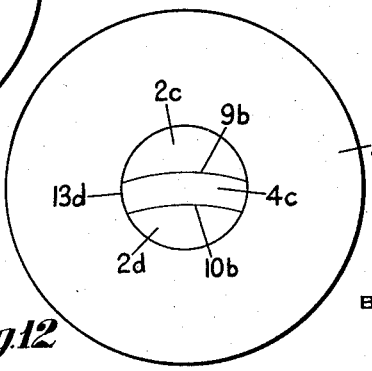
Figure 12 is a view showing a lens blank similar to that shown in Figure 7 but having the inner distance vision portion of arcuate form.

In Figure 12, I illustrate another form of lens blank which embodies the features of my invention. This lens blank is the same as that illustrated in Figure 7 with the exception that the inner distance vision portion 4c is of arcuate form having the upper arched shouldered boundary line 9b and the lower similarly arched shouldered boundary line 10b. The boundary lines 9b and 10b are substantially parallel. The outer area 3 may serve as the distance vision portion and the curvatures of the portion 3 and the inner distance vision portion 4c will be the same so that the ends of the cavity will completely merge with the portion 3 along the hair lines 13d forming continuations of the circular boundary lines of the near vision portions 2c and 2d. However, the outer area 3 may be of such curvature that it will serve as an intermediate vision portion. If such is the case, the ends of the cavity will substantially merge with the portion 3 along the lines 13d since the inner distance vision portion 4c will still have a radius of curvature shorter than that of the portion 3. The cavity forming the vision portion 4c may be readily produced by causing the lens blank to travel in an arcuate path simultaneously with the swinging of the lens blank carrier about the axis 7 (Figure 11). This may be accomplished with the machine illustrated in my copending application.

It will be apparent from the above description that with all forms of my invention, there is provided an elongated horizontally disposed inner distance vision portion located substantially at the center of the lens, a near vision portion disposed directly above and a near vision portion disposed directly below the elongated distance vision portion, and a surrounding outer distance vision or intermediate vision portion. In each form of the lens, there is a substantially flat dividing line between the inner distance vision portion and the upper or lower near vision portion. Furthermore, the optical center of each near vision portion will be located within the inner distance vision portion and adjacent the substantially flat dividing line between such portion and the near portion. Thus, "jump of the image" or prismatic displacement will be substantially eliminated when the line of vision passes from the inner distance vision portion to the adjacent near vision portion. In all forms of my lens blank, the radius of curvature of the surface of the cavity or the inner distance vision portion is shorter than the radius of curvature of the adjacent surface so that the ends of the cavity will merge with the adjacent surface and there will be no shoulders at the ends of the cavity.

It will be apparent that my lens will meet all of the requirements set out at the beginning of this description. My lens is very neat and attractive in appearance. It is of such a nature that it may be produced at a comparatively low cost. Furthermore, I have provided a novel, efficient, simple and practical method for producing my lens.

In the following claims where I specify that the outer area of the lens is a distance vision portion, it is to be understood that I also intend to include an intermediate vision portion. Furthermore, it is to be understood that the inner distance vision portion may be an intermediate vision portion since it is still a "distance" porton as compared to the near portion.

Having thus described my invention, what I claim is:

1. A multifocal ophthalmic lens blank formed from a single piece of glass of substantially the same index of refraction throughout, said blank having an inner area of a predetermined lesser curvature and an outer area of a predetermined curvature formed on one surface thereof, said inner area having an elongated cavity formed therein, the long boundaries of the cavity lying within the boundaries of the inner area, the radius of curvature of the bottom of the cavity being shorter than that of the surface of the inner area so that there will be shoulders formed at both side edges of said cavity and the ends of said cavity will substantially merge with the surface adjacent thereto.

2. A multifocal ophthalmic lens blank formed from a single piece of glass of substantially the same index of refraction throughout, said blank having an inner circular area of a predetermined lesser curvature and an outer area of a predetermined different curvature formed on one surface thereof, said inner circular area having an elongated cavity formed therein, the long boundaries of the cavity lying within the boundaries of the inner area, the radius of curvature of the bottom of the cavity being shorter than that of the surface of the inner area so that there will be shoulders formed at both side edges of said cavity and the ends of said cavity will substantially merge with the surface adjacent thereto.

3. A one-piece multi-focal lens blank comprising an outer distance vision portion of a suitable radius of curvature and an inner near vision portion of a greater radius of curvature lying wholly within the distance vision portion, said portions substantially merging at their junction lines, and an additional distance vision portion ground in the near vision portion, the radius of curvature of the distance portion being shorter than that of the near vision portion, said additional distance vision portion being elongated and having shoulders formed along its top and bottom edges and having its ends substantially merging with the adjacent surface, the long boundaries of the cavity lying within the boundaries of the inner near vision portion.

LOWELL L. HOUCHIN.